June 25, 1946.  A. G. HERRESHOFF  2,402,889
ENGINE AND METHOD OF MAKING PARTS THEREOF
Filed June 18, 1942  4 Sheets-Sheet 1

INVENTOR
ALEXANDER G. HERRESHOFF
BY
Harness, Dick, Pates & Harris
ATTORNEYS

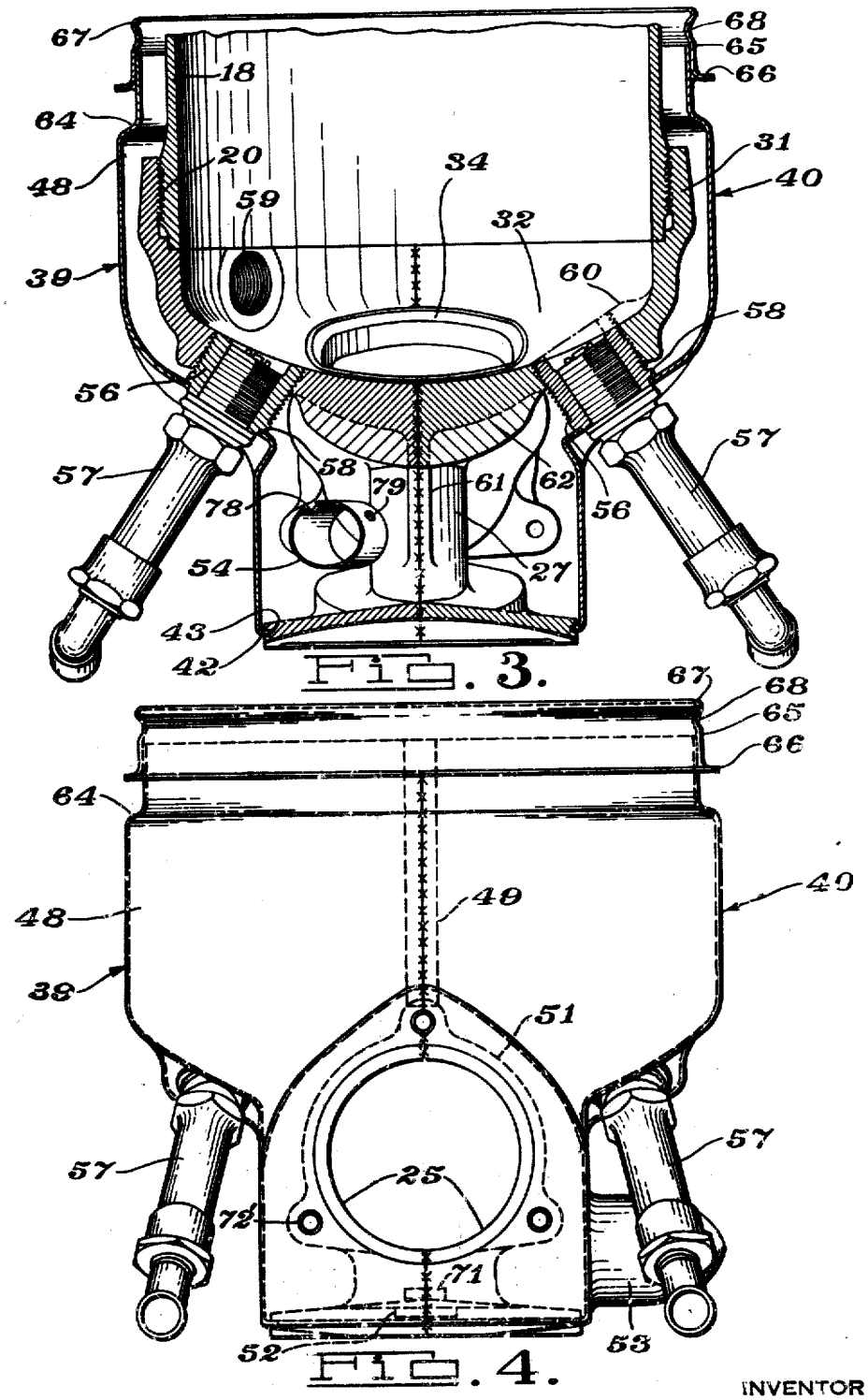

INVENTOR
ALEXANDER G. HERRESHOFF
BY
ATTORNEYS

Patented June 25, 1946

2,402,889

UNITED STATES PATENT OFFICE 2,402,889

ENGINE AND METHOD OF MAKING PARTS THEREOF

Alexander G. Herreshoff, Grosse Pointe, Mich., assignor to Chrysler Corporation, Highland Park, Mich., a corporation of Delaware Application June 18, 1942, Serial No. 447,532

26 Claims. (Cl. 123—173)

This invention relates to engines and refers more particularly to improvements in engines of the types used in aircraft although in its broad aspects my improvements are useful to advantage in engines adapted for any other use.

In the construction of aircraft engines where weight is of great importance, it is customary to form the cylinder heads as castings of light weight alloys such as aluminum, magnesium, or Duralumin. Such castings are open to a number of objections. Because of strength requirements, the wall thickness of such castings must be greater than desired thereby resulting in excessive spacing of adjacent cylinders for a given cylinder bore. Further, such castings are subject to failure owing to difficulty in maintaining uniformity in the structure of the various castings including failures due to core shifting and porosity. In addition, such castings are objectionable in that the intake and exhaust passages cannot be finished to the desired streamline shape and degree of smoothness for maximum operating efficiency of the engine.

It is an object of my invention to overcome the aforesaid difficulties and objections by the provision of improved cylinder head construction and method of making same. In carrying out my invention I form the main body portion of the cylinder head of two steel forgings which are brazed or otherwise integrally bonded together. The plane of juncture between the two halves extends through the axes or center lines of the intake and exhaust passages and contains the axis of the cylinder. Where the engine is of the liquid cooled type I have provided a novel structure of sheet metal jacketing which is likewise brazed or attached in equivalent manner to the main cylinder head portions so as to provide a structural unit of the whole cylinder head.

By reason of my invention the cylinder head is formed of improved strength and uniformity while at the same time having the desired degree of lightness of weight. Furthermore, the plane of division in passing through the intake and exhaust ports or passages affords convenient access thereto, prior to brazing the halves together, for imparting the desired streamline shape and high degree of smoothness. Also, as the walls may be relatively thin, in comparison with cast aluminum, the cylinders may be disposed relatively closer together for a given cylinder bore dimension, resulting in a material saving in the weight, size, and cost of the engine.

An additional object of my invention is to provide a simplified method of constructing engine cylinder heads, especially of the built-up type.

Another object is to provide an improved construction of cylinder and cylinder head assembly including a steel jacketing structure forming a portion of the cylinder head and adapted to co-operate in sealing relationship with the cylinder-receiving tubular portion of the crankcase structure.

Another object of my invention is to provide an improved cooling for the cylinder head, including the exhaust valve stem. I have provided a novel structure for directing coolant directly toward the exhaust valve stem guide boss at each cylinder head; also a novel coolant circulating system and improved sealing means therefor.

Further objects and advantages of my invention reside in the novel structure and methods of assembly comprising the various parts of the engine structure as will be more apparent hereinafter, reference being made to the accompanying drawings illustrating one embodiment of my invention in which:

Fig. 3 is a sectional elevational view taken approximately as indicated by line 3—3 of Fig. 2.

Fig. 4 is a side elevational view of the cylinder head taken as indicated by line 4—4 of Fig. 1.

Figure 1:
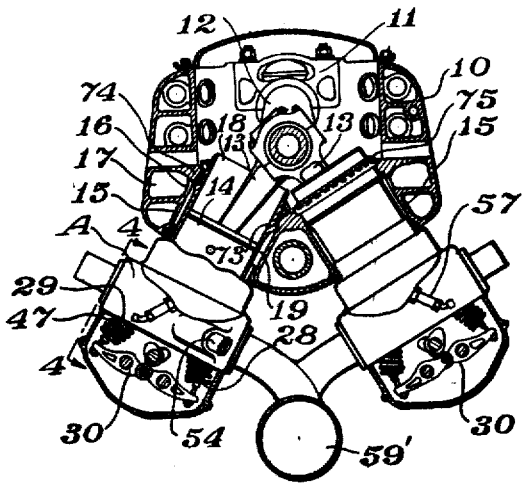
Fig. 1 is a transverse sectional elevational view through the illustrated engine.

Referring to the drawings, I have illustrated my invention in connection with an internal combustion engine of the inverted V-type in which the cylinders are positioned inverted with respect to more conventional practice. Fig. 1 is a typical transverse section through a pair of the V-arranged cylinders of each bank. My invention is not limited to engines having any particular number, arrangement, or positioning of cylinders as it is more concerned with the construction of the cylinder heads and associated parts of the engine together with the method of making the same.

In Fig. 1 the engine comprises a casing structure in the form of a casting 10 carrying bearings such as at 11 for journalling the crankshaft 12 connected by rods 13 to the respective pistons 14. The casing 10 at each typical section corresponding to the Fig. 1 showing is formed with a pair of V-arranged cylinder-receiving tubular portions 15 each having a coolant outlet 16 for admitting coolant to a header 17 formed in the casing.

Figure 5:
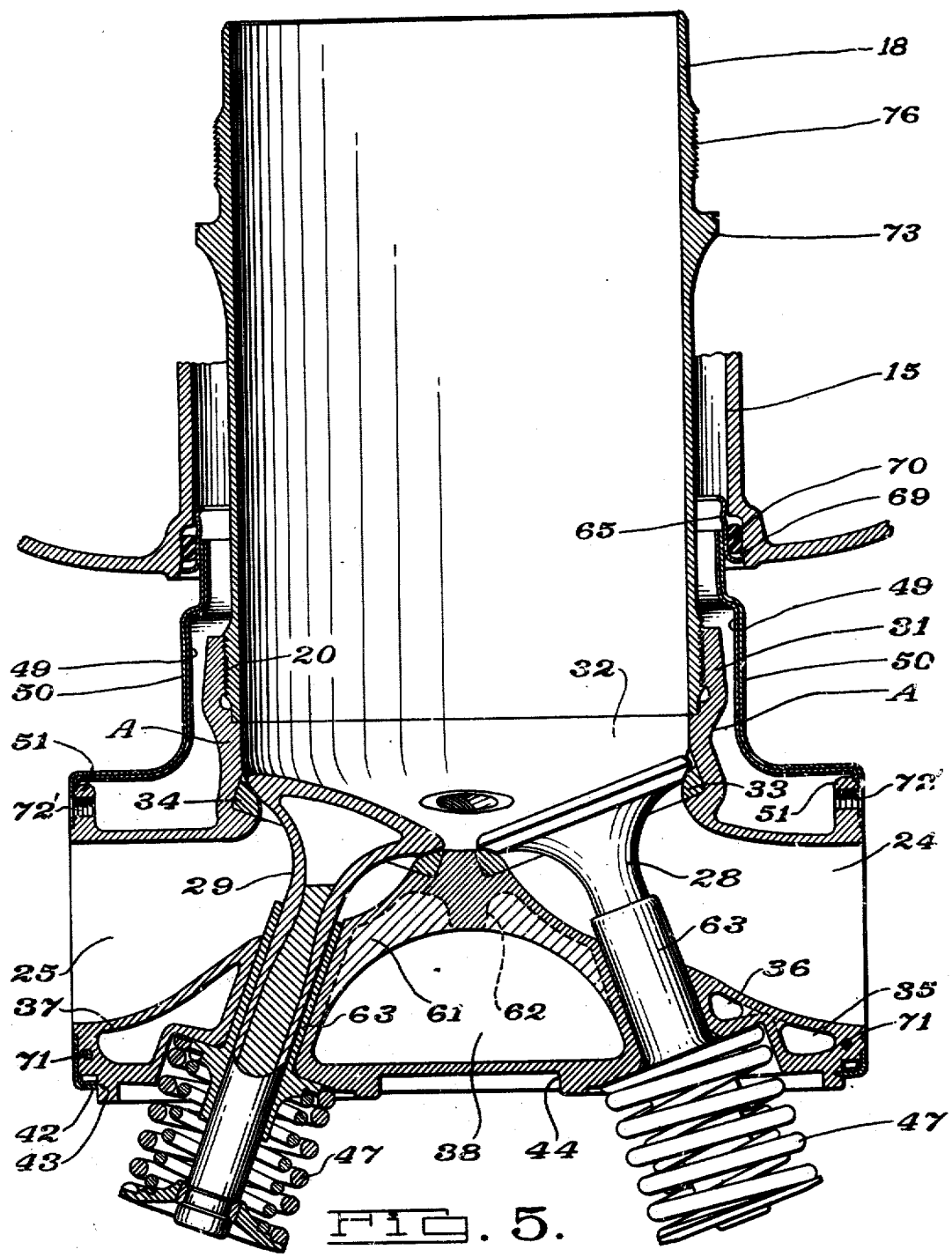
Fig. 5 is an enlarged sectional elevational view of the left cylinder and cylinder head assembly as seen in Fig. 1.

Inasmuch as any cylinder and its associated cylinder head of the engine is typical of the group, I have arbitrarily selected the left cylinder of Fig. 1 to illustrate the details of my invention and the following description will, for the most part, be directed to this typical structure in which the piston 14 operates in a cylinder 18 securely seated adjacent its inner end to the inner end of the tubular portion 15 and spaced therefrom to provide a liquid coolant jacket 19 from which coolant is circulated inwardly from the cylinder head to the outlet 16 and header 17. The outer end of the cylinder 18 mounts the cylinder head assembly A by a threaded connection 20 (Fig. 5).

The cylinder head A comprises a pair of generally similar steel forgings 21 and 22 each of which is formed with a plane boundary surface 23 extending transversely of the engine. Depressed or extending from each surface 23 is a concave hemi-intake port or passage 24 and a concave hemi-exhaust port or passage 25; also the hemi-cylindrical valve stem guide-receiving openings, housings, or bosses formed by concavities 26 and 27 for respectively housing or receiving the guides for the stems of the intake and exhaust valves 28 and 29 adapted for operation by the valve gear generally designated at 30; and also a hemi-cylindrical cylinder-carrying portion 31 depending inwardly of the engine from the hemi-ports 24 and 25, and having a hemi-spherical combustion chamber portion 32 open to the inner ends of the hemi-ports where the ports are shouldered to receive the valve seat inserts 33 and 34.

The forgings 21 and 22 form the main body portions of the cylinder head A and are copper brazed or otherwise integrally bonded together at their mating surfaces 23 such that the corresponding concave or depressed portions aforesaid align with each other as will be readily understood to form the complete intake and exhaust ports, valve stem guide-receiving cylindrical openings, cylinder-carrying portion, and combustion chamber. The wall forming each of the surfaces 23 has the openings 35, 36, 37 and 38 extending therethrough, these openings being similar for each of the main forgings 21 and 22 so that when they are brazed together the corresponding openings will be in alignment with each other to accommodate circulation of a coolant around the valve stem guides and ports.

Figure 6:
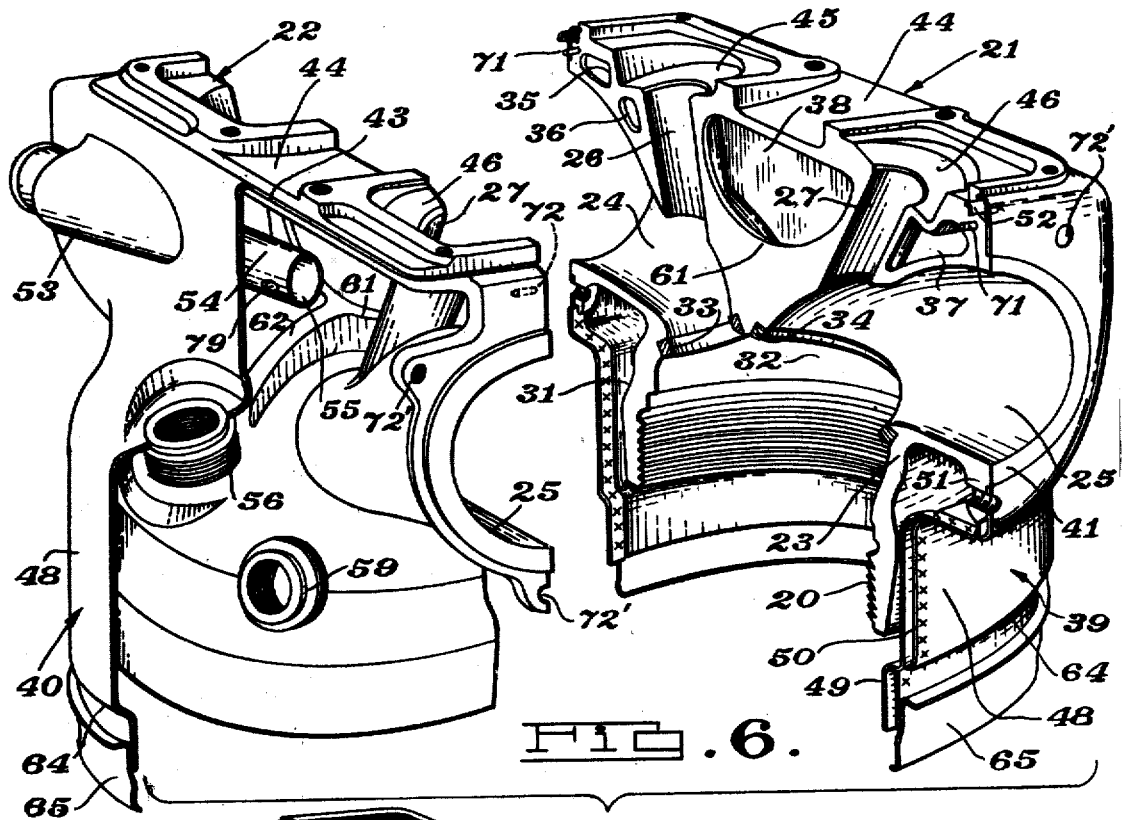
Fig. 6 is an inverted perspective view of the cylinder head assembly, the component parts of the main body and jacketing portions being shown separated at their brazed surfaces, a portion of the jacket being broken away.

Surrounding the forgings 21 and 22 are the enclosing coolant jacketing members 39 and 40 respectively. These jacketing members are steel stampings, each having a hemi-opening surrounding the outer end of the associated hemi-port 25 and a like opening surrounding the hemi-port 24. At these regions the side walls of the forgings are faced back so as to form ribs or flanges adjacent the outer ends or terminal portions of the ports, as at 41 in Fig. 6, such that the adjacent outer side surfaces of jacketing members are flush with the faces of these ribs (Figs. 5 and 6).

Figure 7:
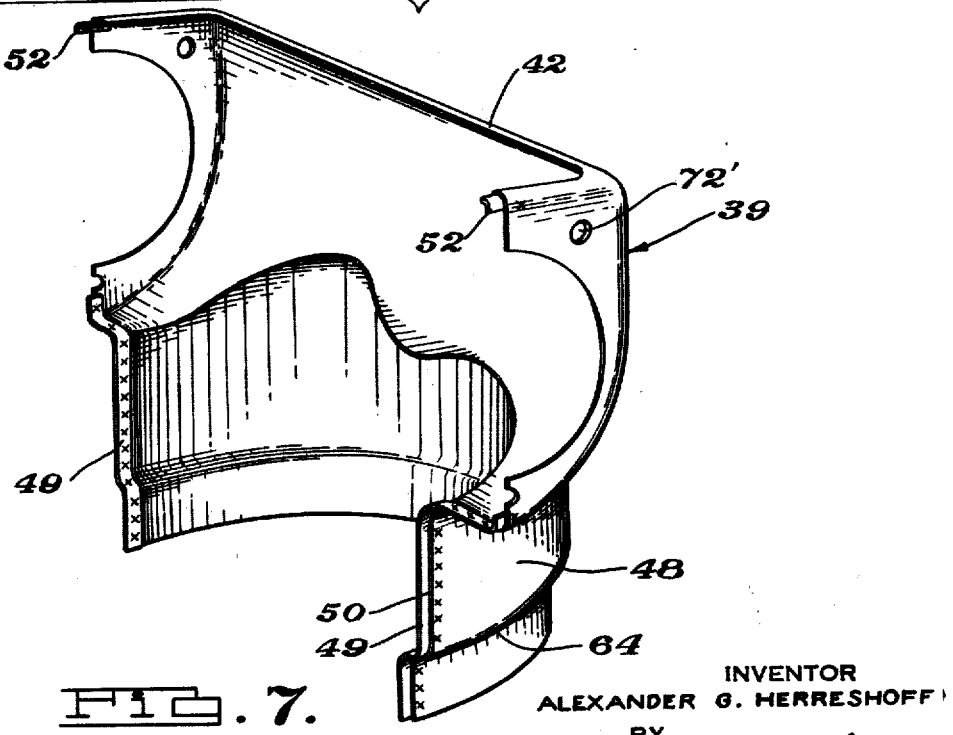
Fig. 7 is a perspective view of one of the component jacketing portions as seen in Fig. 6.

At its outer end, each of the jacketing members 39 and 40 is formed with an in-turned flange 42 (Fig. 7) seated in an outwardly open groove 43 formed in the outer margin of a shelf portion 44 of each forging, each shelf serving to transversely tie together the outer end portions of a pair of the hemi-guides or hemi-bosses 26 and 27 and being formed with a pair of recessed hemi-seats 45, 46 each of which is adapted to seat a spring 47 for closing a valve 28 or 29.

Each jacketing member 39 and 40 has a hemi-cylindrical portion 48 spaced from the associated hemi-cylindrical portion 31 and concentric therewith so that the coolant may circulate around the combustion chamber and ports and pass inwardly of the engine to the jacket 19. A bridge strip 49 is tack-welded to the inner surface of one of the jacketing members, such as jacketing member 39, Fig. 6, adjacent each marginal face 50 in the plane of face 23. Each strip 49 extends from the inner end of the jacket portion 48 to the shoulder 51 (Figs. 5 and 6) adjacent the outer ends of the port, the shoulders being recessed to seat these strips.

Additional bridge pieces 52 are tack-welded to jacketing member 39 adjacent the face 23. When the jacketing members 39 and 40 are brought together their corresponding faces 50 abut each other in the same plane with the engaging faces 23, and the portions of the bridge pieces 49 and 52, which are shown projecting from these faces, then engage the inner faces of the jacketing member 40 so as to strengthen the union between the jackets and facilitate brazing of the jacketing members together. The bridge pieces are brazed to the jacketing members 39 and 40 at the same time that the jacketing members are brazed together at faces 50.

Jacketing member 40 is formed with a struck-out pocket portion 53 (Figs. 2 and 6) for receiving a coolant tube 54 which is disposed so that its outlet 55 is directed toward the guide 27 for the exhaust valve stem for cooling the same at this critical region. The tube 54 is brazed in position.

A pair of inserts 56 (Fig. 3) are externally threaded for engagement in the walls of the forgings 21 and 22 respectively so that they lie at the combustion chamber portions 32. Each insert 56 is internally threaded to mount an engine accessory, in this instance a spark plug assembly 57. Each insert has a shoulder 58 for seating the marginal portion of an opening provided in the associated jacketing member 39 or 40, the inserts being brazed to the jacketing members to form a liquid-tight joint. A further generally similar insert 59 (Figs. 3 and 6) is threaded into the wall of forging 22 at the combustion chamber and is similarly joined with the jacketing member 40. This insert 59 is adapted to mount a further engine accessory such as a liquid fuel injecting nozzle (not shown) of any well known type when the engine is of the fuel injection type.

In the illustrated fuel injection type of engine the intake valve 28 admits air from the manifold 59′, ordinarily supplied from a supercharger, to the combustion chamber, the valve 29 controlling escape of the exhaust gases through the exhaust port 25—25. If desired, the fuel injection insert 59 may be omitted and the fuel and air mixture admitted at the intake valve in accordance with well known practice.

In order to insure that the various inserts 56, 59 shall conform with the desired smooth surface of the combustion chamber and also that the shoulders 58 shall fit with the jackets, I arrange these inserts for installation as follows. Before the combustion chamber is machined the forgings are provided with shoulders or bosses at the locations of the inserts. For example in Fig. 3 I have illustrated one of these shoulders 60 for an insert 56. The insert is threaded into the forging and boss 60 and is brazed in position. Then the internal threads are cut in the insert, the shoulder 58 formed for fit with the jacket, and the combustion chamber machined to desired finish while at the same time the boss 60 is cut away leaving the insert flush with the combustion chamber contour. This practice is followed for each of the inserts which are brazed and machined at the same time.

Each hemi-forging is provided with brace reinforcing ribs which tie together the respective hemi-guides 26, 27 and the inserts 56 thereby also provided an external X-brace for the combustion chamber. The center of the X-brace thus formed lies along the axis of cylinder 18 and in the plane of union at 23 of the hemi-forgings. A transverse rib 61 (Figs. 3, 5 and 6) joins the hemi-guides of each forging and is faced to present a portion of the aforesaid plane surface 23 so that these two ribs 61 are brazed together at surface 23 to form, in effect, a single structural rib of double the thickness of each component rib part 61. Each forging also is provided with a longitudinally extending outwardly projecting rib 62 extending between the opening for an insert 56 and the mid-region of the associated rib 61. When the forgings are brazed together the two ribs 62 are in alignment and form one component arm of an X-brace of which the other arm is formed by the brazed ribs 61.

By preference each of the guides formed by the mating hemi-guides 26, 26 and 27, 27 receives a sleeve 63 (Fig. 5). These sleeves provide a sliding bearing for the stems of the valves 28, 29 and are formed of material suitable for this purpose, such as bronze.

At the inner end of the assembly, the terminal cylinder-forming portions of the jacketing members 39 and 40 are inwardly offset at shoulder 64 (Fig. 3) from portions adjacent thereto surrounding the threaded connection 20. This offset end portion is fitted with an external reinforcing ring 65 which has its opposite ends flanged at 66 and 67 in relatively opposite directions and is provided with an intermediate strengthening rib 68. The ring 65 is brazed in position. The inner end portion 67 pilots the ring into the tubular portion 15 and the intermediate portion of the ring cooperates with the counterbore 69 of tubular portion 15 to squeeze a deformable sealing ring 70 therebetween serving to form a fluid-tight joint.

In the assembly of the various parts forming the cylinder head structure, I form the steel forgings 21 and 22 and machine the mating surfaces 23. The hemi-ports are also conveniently finished to the desired degree and streamline shape. The forgings are then checked for proper mating and the dowel pins 71 located and assembled for fit with holes 72 to insure proper mating. I then fixture locate, drill, and tap the forgings 21, 22 for the respective inserts 56 and 59 which are then assembled in place. By assembling these inserts prior to brazing the forgings together I am enabled to copper braze, in one operation, the halves of the forgings and also the inserts. This brazing operation is then performed.

Then the outer or valve gear end of the cylinder head is rough milled and the combustion chamber 32—32 rough machined, the bosses 60 and inner ends of the inserts 56, 59 being cut off during this operation.

I then machine the valve-stem housings 26—26 and 27—27 and the shoulders for valve seat inserts 33, 34. These valve seat inserts are then assembled and copper brazed in place. I then finish mill the outer end of the head and profile, groove 43 being formed, and I also finish machine the outer end portions of the intake and exhaust ports 24—24 and 25—25 respectively.

Then the jacketing members 39 and 40 are assembled including tack welding into proper position the tube 54, bridge strips 49 and 52, and the reinforcing ring 65. At some convenient point in the method, such as at this time of assembly of the jacketing members, the shoulders 58 are formed on the inserts for proper fit with the openings of the assembled jacketing members. I then silver braze all joints of the jacket-forming structure including flange 42, the engaging faces 50 along with strips 49 and 52, tube 54, and ring 65. Silver brazing, rather than copper brazing is preferably employed at this step in the method at this is done, as is well known, at a considerably less temperature of around 1175° F. than with copper brazing of around 2050° F. Therefore there will be no possibility of the previously copper brazed parts being disturbed or warped during the silver brazing of the jacket into position, especially as inspection of all of the copper brazed parts would be difficult after brazing the jacket in the assembly. In addition, silver brazing is preferred for the jacket-forming structure as this is somewhat more effective than copper brazing where the parts are not held to closely fitting limits. It is neither necessary nor convenient to hold the stamped parts to such fit and therefore the well known commercial silver brazing process is well adapted for such stamped parts. However welding or copper brazing may be employed, instead of silver brazing, if desired.

The assembly is then finished and cleaned up in detail. For example a skin cut may be taken at the outer ends of the intake and exhaust ports; all remaining holes are drilled and tapped including those at 72 at the ends of the ports; the combustion chamber is finished; the threads are cut for the connection at 20 with the cylinder 18, the bronze guides 63 are inserted and machined; the valve seat inserts 33, 34 are ground; and the assembly generally finished where desired.

While the foregoing steps in my method are outlined as to some of the details which are involved, it should be understood that the relative order of conducting many of these steps may be varied as desired and my method invention, in its broader aspects is not limited to such outlined steps which have been set forth by way of illustration. Furthermore, while I prefer to integrally bond together the component parts of my cylinder head construction by brazing, other methods of integrally bonding may be employed, such as welding.

The plane 23 of bonding between the forgings 21 and 22 contains the axis of cylinder 18 and also the center of the spherical combustion chamber 32—32.

The cylinder 18 is securely seated in the casing 10 to resist outward thrust of the cylinder caused by the explosion pressure developed in the combustion chamber 32—32. This pressure tends to force the cylinder head outwardly and this force is transmitted to cylinder 18 through the threaded connection 20.

Each cylinder has an annular shoulder 73 intermediate its length for seating on an annular shoulder 74 which bounds an opening in casing 10 through which opening the cylinder projects to threadedly receive a clamp ring 75 at the threads 76 (Figs. 1 and 6). This clamp ring seats on the inner face of shoulder 74 and serves to hold the cylinder firmly secured to the casing 10.

Figure 2:
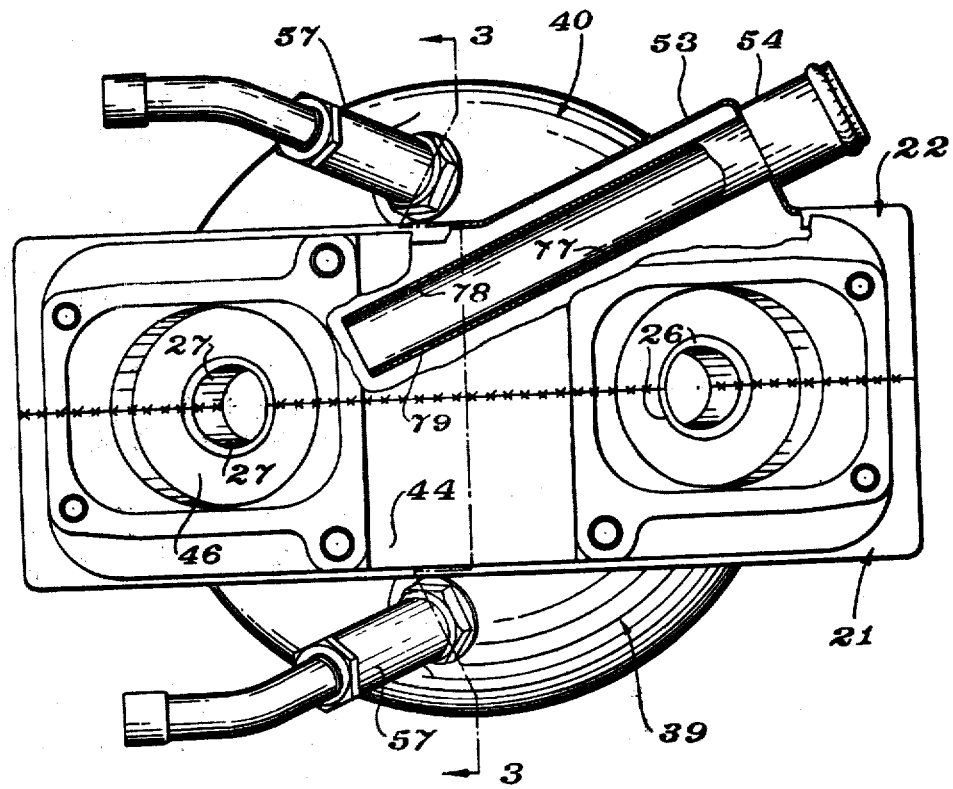
Fig. 2 is a bottom plan view of the cylinder head assembly which is shown at the left side of Fig. 1.

In Figs. 2 and 6 it will be apparent that the incoming coolant, which is supplied in any convenient manner to the tube 54 of each cylinder head, is discharged at 55 from each tube. The tube is so directed in relation to the exhaust valve stem housing 27—27 that the incoming coolant impinges directly against this housing coming from a direction transversely to the axis of the housing. Therefore this critical region, from a standpoint of heat developed at the cylinder head, is maintained sufficiently cool to improve the operating efficiency of the combustion process and the engine in general. In aircraft engines the valve 29 and its stem is ordinarily hollow as shown in Fig. 5 to receive sodium or other medium to assist cooling of the valve as is well known in the art. My invention is especially useful in connection with valves of this type and serves to carry away much of the heat by efficient cooling of the housing 27—27. In addition, my arrangement insures against sticking of the valve 29 from causes incident to lack of proper cooling of the valve and its stem.

While the major portion of the incoming coolant is directed in a stream to impinge on the exhaust valve-stem-receiving housing 27—27, the tube 54 is preferably provided at proper locations intermediate its length with one or more openings pointed or directed toward other critical regions at the combustion chamber for directing lesser streams of the coolant toward such regions. Thus the openings 77, 78 and 79 (Figs. 2, 3 and 6) are respectively directed so as to direct a stream of the incoming coolant respectively toward the intake valve-stem-receiving housing 26—26 and toward each of the two spark plug mounting inserts 56. This serves to cool the intake valve and its stem and also the spark plugs 57.

I prefer to form the cavities 26 and 27 during the forging of the bodies 21 and 22 at the same time that cavities 25, 26 and 32 are formed. However, if desired, the face 23 may be forged flat across the region of the cavities 26 and 27 and these openings machined out after the bodies 21 and 22 have been integrally bonded together.

Where I have referred to copper brazing I mean the well known commercial process sometimes called copper hydrogen brazing or welding wherein the parts to be brazed are subjected to a relatively high temperature, usually in the neighborhood of from 2050° F. to 2100° F., in a reducing atmosphere such as hydrogen and in the presence of copper locally applied or in proximity with the surfaces to be joined.

I claim:

1. A cylinder head for an internal combustion engine comprising, a pair of cylinder head-forming structures each having a face and a port-forming cavity, said structures being integrally bonded together at said faces, said cavities being so disposed in relation to each other to together form a gas-conducting port, each of said cavities extending throughout the length of said port.

2. A cylinder head for an internal combustion engine comprising, a pair of steel forgings each having a face and a combustion chamber-forming cavity and a port-forming cavity, said forgings being integrally bonded together at said faces, said combustion chamber-forming cavities being so disposed in relation with each other to together form a combustion chamber, said port-forming cavities being so disposed in relation with each other to together form a port open to said combustion chamber.

3. An engine cylinder head having a combustion chamber-forming portion and a gas-conducting port, said port having at one end thereof an opening directed outwardly of the cylinder head and having at the other end thereof an opening directed inwardly of the cylinder head in communication with said combustion chamber-forming portion, said head comprising hemi-head-forming structures integrally bonded together in a plane substantially containing said port and its said openings such that said hemi-structures are respectively formed with approximate hemi-portions of said port and said openings.

4. An engine cylinder head having a combustion chamber and a port communicating therewith, said head comprising hemi-head-forming structures integrally bonded together in a plane containing said combustion chamber and port such that said hemi-structures are respectively formed with approximate hemi-portions of said combustion chamber and port.

5. A cylinder head according to claim 1, each of said structures having a hemi-valve-stem-receiving cavity branched from the port-forming cavity thereof, said hemi-cavities being so disposed in relation to each other to together form an opening in the cylinder head for receiving therein the stem of a valve.

6. An engine cylinder head having a combustion chamber, a pair of ports communicating with said combustion chamber, and a pair of valve-stem-receiving openings respectively branched from said ports, said head comprising hemi-head-forming structures integrally bonded together in a plane containing said combustion chamber, ports, and openings such that said hemi-structures are respectively formed with approximate hemi-portions of said combustion chamber, ports, and openings.

7. An engine cylinder head according to claim 6, said cylinder head having a shelf adapted to be formed with a pair of inwardly depressed valve-spring-receiving recesses respectively aligned with said valve-stem-receiving openings, said shelf being so disposed in relation with said plane of bonding that said hemi-structures are respectively formed with approximate hemi-portions of said shelf recesses.

8. An engine cylinder head according to claim 3, a jacket surrounding said cylinder head and having portions thereof spaced from portions of said cylinder head to receive a cooling medium, said jacket comprising hemi-jacket-forming structures bonded integrally to said cylinder head and bonded integrally together approximately in the aforesaid plane.

9. An engine cylinder head having a combustion chamber and a pair of ports extending outwardly therefrom, a jacketing structure for said head comprising a pair of stamped sheet metal members integrally bonded together, each of said members having a pair of cavities respectively fitting around terminal hemi-portions of said ports.

10. In an internal combustion engine, a cylinder, a cylinder head structure secured to the outer end portion of said cylinder, said head structure having a combustion chamber portion and a pair of valve-controlled ports leading outwardly from said chamber, said head structure having a shelf portion disposed in jacketed relationship with respect to said ports, said shelf portion having a pair of valve-spring-receiving cavities formed in a face thereof, and a jacket structure secured to said head structure, said jacket structure having a pair of side wall portions extending between end portions of said jacket structure, each of said side wall portions being provided with an opening surrounding a terminal portion of one of said ports, said jacket structure having an opening at one end portion thereof adapted to receive said shelf portion, the other end portion of said jacket structure surrounding said outer end portion of said cylinder in jacketing relationship therewith.

11. In an engine according to claim 10, said jacket structure comprising hemi-jacket members integrally bonded to each other approximately in a plane of bonding containing the axes of said cylinder and ports.

12. In an internal combustion engine, a casing structure having a tubular portion open inwardly and outwardly thereof, a cylinder disposed within said tubular portion and having its inner end portion anchored to the inner end portion of said tubular portion, the intermediate portion of said cylinder being spaced within said tubular portion in jacketing relationship therewith, a cylinder head structure comprising a ported body portion secured to and projecting outwardly from the outer end portion of said cylinder, said cylinder head structure comprising a jacket having a substantially cylindrical portion surrounding and spaced from said outer end portion of said cylinder in jacketing relationship therewith, said cylindrical portion projecting into the outer end portion of said tubular portion, and fluid sealing means disposed between said outer end portion of said tubular portion and said cylindrical portion.

13. In an engine cylinder head, a body having a combustion-chamber-bounding wall, a sheet metal jacket spaced from said wall in jacketing relationship therewith, said wall and jacket having aligned openings respectively extending therethrough, and an accessory-mounting insert having an inner end portion fitting within and integrally bonded to said wall opening and having an outer end portion thereof engaging portions of said jacket which bound said jacket opening and being integrally bonded thereto, said insert being of such lengths as to space the jacket opening-bounding portions from said wall.

14. In an engine cylinder head structure having a combustion chamber, a tubular housing for receiving the stem of a valve, an accessory-mounting insert for said structure disposed in heat conducting relationship with said combustion chamber, means jacketing said head for subjecting said tubular housing and said insert to a coolant, and a coolant supply tube disposed within said jacketing means and having its discharge end directed toward said tubular housing, said supply tube having an opening intermediate its length for directing coolant from said tube for impinging on said insert.

15. The method of making a cylinder head for an internal combustion engine, comprising, forming a pair of component cylinder head structures such that each has a face and a port-forming cavity depressed therein, and integrally bonding said structures together at said faces with said cavities so disposed in relation to each other that they together form a gas-conducting port.

16. The method of making a cylinder head for for an internal combustion engine, comprising, forging a pair of component cylinder head structures of steel such that each has a face from which a combustion chamber-forming cavity and a port-forming cavity are depressed, and integrally bonding said structures together at said faces with said combustion chamber-forming cavities so disposed in relation to each other that they together form a combustion chamber and with said port-forming cavities so disposed in relation to each other that they together form a port open to the combustion chamber.

17. The method of making an engine cylinder head of the type having a gas-conducting port, comprising, forging approximate hemi-portions of said head each with a cavity defining an approximate hemi-portion of said port, and integrally bonding said head portions together.

18. The method of making a ported cylinder head of the type having a combustion chamber and a valve-stem-receiving opening, comprising, forming approximate hemi-portions of said head each with relatively branched cavities, and integrally bonding said hemi-portions together such that said branched cavities of said hemi-portions together form said combustion chamber, port, and opening.

19. The method of making an engine cylinder head according to claim 17, forming a pair of component jacket members each with a cavity in one edge thereof, and integrally bonding said jacket members together with said cavities fitting and in bonded relationship with a terminal hemi-portion of said port.

20. The method of making a jacketed engine cylinder head, comprising, forming a cylinder head body with a combustion chamber-bounding wall having a portion thereof bossed inwardly of the combustion chamber, integrally bonding an accessory-mounting insert with said bossed portions of said wall such that a portion of said insert projects outwardly from said wall, installing a jacket in spaced relationship with respect to said body, integrally bonding said jacket to said body and to said projecting portion of said insert, and machining away the bossed portion of said wall and the portion of the insert disposed therein.

21. The method of making a jacketed cylinder head for an engine comprising, forging from steel the head body portion in halves each having component portions of a combustion chamber and component portions of a terminally-flanged port, pressing from sheet metal the jacket in halves such that each half-jacket is provided with a recess in an edge thereof, and integrally bonding together the halves of the head body portion and the halves of the jacket in assembled relationship with said recesses engaging hemi-portions of said port flange.

22. The method of making a jacketed cylinder head for an engine comprising, forging from steel the head body portion in halves each having component portions of a combustion chamber and component portions of and one or more ports, pressing from sheet metal the jacket in halves, copper brazing the halves of the head body portion together, and then silver brazing the halves of the jacket to each other and to the brazed-together halves of the head body portion.

23. An engine cylinder head having a combustion chamber, a pair of ports communicating with said combustion chamber, and a pair of valve-receiving openings respectively branched from said ports, said head comprising hemi-head-forming structures integrally bonded together in a plane containing said combustion chamber and ports such that said hemi-structures are respectively formed with approximate hemi-portions of said combustion chamber and ports, said cylinder head having a reinforcing rib joining together portions of said ports and openings and a second reinforcing rib extending transversely relative to the first said rib, said ribs being so disposed in relation with said plane of bonding that said hemi-structures are respectively formed with approximate hemi-portions of said ribs.

24. A cylinder head for an internal combustion engine comprising, a pair of cylinder head-forming structures each having a face and a port-forming cavity, said structures being integrally bonded together at said faces, said cavities being so disposed in relation to each other to together form a gas-conducting port, said cylinder head having an annular flange bounding the outer end portion of said port, a pair of jacketing members each having a face and a flange-receiving cavity, said jacketing members being integrally bonded together at their said faces and to said cylinder head-forming structures to provide a coolant jacket therefore, said flange-receiving cavities being so disposed in relation to each other to together form an opening fitting said annular flange.

25. An engine cylinder head having a combustion chamber and a pair of ports extending outwardly therefrom, a jacketing structure for said head comprising a pair of stamped sheet metal members integrally bonded together, each of said members having a pair of cavities respectively fitting around terminal hemi-portions of said ports, said cylinder head including an exhaust valve-stem-receiving tubular housing, one of said members having a tube-receiving pocket portion depressed therefrom, and a tube for admitting coolant to said jacket structure, said tube being disposed in said pocket and directed toward said tubular housing for impinging incoming coolant on said tubular housing.

26. An engine cylinder head adapted for mounting on a cylinder-receiving tubular casing portion, said head comprising a ported body and a sheet metal jacketing structure attached to said body and having a terminal cylindrical portion adapted to extend into an end of said tubular casing portion, a reinforcing ring fitting the outer wall of said terminal cylindrical portion and having a portion thereof backed by said terminal cylindrical portion for externally seating a seal fitting between said tubular casing portion and said reinforcing ring, said reinforcing ring having a terminal flange projecting freely beyond said terminal cylindrical portion adapted to pilot said terminal cylindrical portion in said tubular casing portion.

ALEXANDER G. HERRESHOFF.

Certificate of Correction

Patent No. 2,402,889. June 25, 1946.

ALEXANDER G. HERRESHOFF

It is hereby certified that error appears in the printed specification of the above numbered patent requiring correction as follows: Column 10, line 68, claim 23, for "valve-receiving" read *valve-stem-receiving*; and that the said Letters Patent should be read with this correction therein that the same may conform to the record of the case in the Patent Office.

Signed and sealed this 15th day of October, A. D. 1946.

[SEAL]

LESLIE FRAZER,
*First Assistant Commissioner of Patents.* gether portions of said ports and openings and a second reinforcing rib extending transversely relative to the first said rib, said ribs being so disposed in relation with said plane of bonding that said hemi-structures are respectively formed with approximate hemi-portions of said ribs.

24. A cylinder head for an internal combustion engine comprising, a pair of cylinder head-forming structures each having a face and a port-forming cavity, said structures being integrally bonded together at said faces, said cavities being so disposed in relation to each other to together form a gas-conducting port, said cylinder head having an annular flange bounding the outer end portion of said port, a pair of jacketing members each having a face and a flange-receiving cavity, said jacketing members being integrally bonded together at their said faces and to said cylinder head-forming structures to provide a coolant jacket therefore, said flange-receiving cavities being so disposed in relation to each other to together form an opening fitting said annular flange.

25. An engine cylinder head having a combustion chamber and a pair of ports extending outwardly therefrom, a jacketing structure for said head comprising a pair of stamped sheet metal members integrally bonded together, each of said members having a pair of cavities respectively fitting around terminal hemi-portions of said ports, said cylinder head including an exhaust valve-stem-receiving tubular housing, one of said members having a tube-receiving pocket portion depressed therefrom, and a tube for admitting coolant to said jacket structure, said tube being disposed in said pocket and directed toward said tubular housing for impinging incoming coolant on said tubular housing.

26. An engine cylinder head adapted for mounting on a cylinder-receiving tubular casing portion, said head comprising a ported body and a sheet metal jacketing structure attached to said body and having a terminal cylindrical portion adapted to extend into an end of said tubular casing portion, a reinforcing ring fitting the outer wall of said terminal cylindrical portion and having a portion thereof backed by said terminal cylindrical portion for externally seating a seal fitting between said tubular casing portion and said reinforcing ring, said reinforcing ring having a terminal flange projecting freely beyond said terminal cylindrical portion adapted to pilot said terminal cylindrical portion in said tubular casing portion.

ALEXANDER G. HERRESHOFF.

Certificate of Correction

Patent No. 2,402,889. June 25, 1946.

ALEXANDER G. HERRESHOFF

It is hereby certified that error appears in the printed specification of the above numbered patent requiring correction as follows: Column 10, line 68, claim 23, for "valve-receiving" read *valve-stem-receiving*; and that the said Letters Patent should be read with this correction therein that the same may conform to the record of the case in the Patent Office.

Signed and sealed this 15th day of October, A. D. 1946.

[SEAL]

LESLIE FRAZER,
*First Assistant Commissioner of Patents.*